US006651990B2

(12) United States Patent

Higasi et al.

(10) Patent No.: US 6,651,990 B2
(45) Date of Patent: Nov. 25, 2003

(54) TOOL HOLDER

(75) Inventors: Takehito Higasi, Fuchu (JP); Yasuo Wada, Fuchu (JP)

(73) Assignee: Ryobi Ltd., Fuchu (JP)

( * ) Notice: Subject to any disclaimer, the term of this patent is extended or adjusted under 35 U.S.C. 154(b) by 29 days.

(21) Appl. No.: 09/921,887

(22) Filed: Aug. 6, 2001

(65) Prior Publication Data

US 2003/0025281 A1 Feb. 6, 2003

(51) Int. Cl.[7] .............................................. B23B 31/107
(52) U.S. Cl. ......................................... 279/19.4; 279/75
(58) Field of Search ............................... 279/19.4, 19.5, 279/22, 24, 30, 74, 75, 904, 905; 403/327, 329, DIG. 6, 377; 81/438, 439

(56) References Cited

U.S. PATENT DOCUMENTS

| | | | | |
|---|---|---|---|---|
| 4,824,298 A | * | 4/1989 | Lippacher et al. | 279/905 |
| 5,558,478 A | * | 9/1996 | Odendahl et al. | 279/19.5 |
| 5,709,391 A | * | 1/1998 | Arakawa et al. | 279/19.4 |
| 6,092,814 A | * | 7/2000 | Kageler | 279/19.4 |
| 6,457,916 B2 | * | 10/2002 | Wienhold | 279/30 |
| 6,464,234 B2 | * | 10/2002 | Frauhammer et al. | 279/19.4 |
| 6,497,418 B2 | * | 12/2002 | Yahagi | 279/19.4 |

FOREIGN PATENT DOCUMENTS

| | | | | |
|---|---|---|---|---|
| GB | 2171340 A | * | 8/1986 | 279/19.5 |
| JP | B2 3-43003 | | 7/1991 | |
| JP | A 9-70772 | | 3/1997 | |
| JP | A 2000-218412 | | 8/2000 | |
| JP | 2000218412 A | * | 8/2000 | B23B/31/107 |

* cited by examiner

*Primary Examiner*—Steven C. Bishop
(74) *Attorney, Agent, or Firm*—Oliff & Berridge, PLC

(57) ABSTRACT

A tool holder, for mounting a bit formed with a groove onto a power tool, includes a tool-holding tool, an engagement member, and a resilient member. The tool-holding tube defines a bit insertion hole that extends in an axial direction. The tool-holding tube is formed with an elongated hole that is in connection with the bit insertion hole and that extends in the axial direction. The engagement member is disposed in the elongated hole and partially protrudes into the bit insertion hole. The engagement member is movable, by abutment with and pressing force from the bit being inserted into the bit insertion hole, in the axial direction and, when located at a retraction position in the axial direction, also outward in a radial direction of the tool-holding tube. The resilient member is disposed to an outer periphery of the tool-holding tube at the retraction position. The resilient member increases in radial dimension from an initial state by pressure from the engagement member moving outward by pressing force from the bit. The resilient member resiliently returns to the initial state when pressure from the engagement member stops because the groove of the bit is located at the retraction position. As a result, the resilient member presses the engagement member inward in the radial direction into engagement with the groove of the bit.

16 Claims, 13 Drawing Sheets

A

A

A

B

C

D

TOOL HOLDER

BACKGROUND OF THE INVENTION

1. Field of the Invention

The present invention relates to a tool holder for, for example, a hammer drill.

2. Description of the Related Art

Recently, some tool holders enable a user to attach the bit onto a power tool without manipulating a tool sleeve. Such tool holders include a tool-holding tube that the bit is inserted into and an engagement member that engages in a groove formed in the bit in order to prevent the bit from pulling out of the tool-holding tube. The engagement member is disposed in an elongated hole that follows the axial direction of a tool-holding tube. When a bit is inserted to a sufficient extent into the tool-holding tube, the engagement member moves in the radial direction of the tool-holding tube into engagement with the groove of the bit.

For example, Japanese Patent-Application Publication No. HEI-3-43003 discloses a tool holder with a tool-holding tube and a ball as an engagement member. The ball is movable within an elongated hole formed in the tool-holding tube so as to extend in the axial direction of the tool-holding tube. Also, a spring is interposed between the tool-holding tube and a tool sleeve of the tool holder. The spring urges the ball toward the tip of the tool holder in the axial direction of the tool-holding tube.

After the tool holder has been assembled together, the ball protrudes into the bit insertion hole of the tool-holding tube, that is, inward more than the inner peripheral surface of the tool-holding tube. When a bit is inserted from the tip of the tool holder, the rear tip of the bit contacts the ball and presses the ball away from the tip of the tool holder against the urging force of the spring. While the ball moves away from the tip of the tool holder, the ball also moves outward in the radial direction of the tool-holding tube so that the bit can be further inserted into the bit-insertion hole of the tool-holding tube. At this point the ball is pressed by the spring against the outer peripheral surface of the bit. When the bit is inserted until the groove formed in the bit is aligned with the ball, the urging force of the spring moves the ball inward in the radial direction of the tool-holding tube into engagement with the groove of the bit. In this way, the bit can be mounted on the tool holder without manipulating the tool sleeve.

Japanese Patent-Application Publication No. HEI-9-70772 discloses a tool holder with a key as an engagement member. A regulating sleeve, which is slidable in the axial direction of the tool-holding tube, is interposed between the tool-holding tube and the tool sleeve. The regulating sleeve regulates movement of the key in the radial direction of the tool-holding tube. Also, a stopper spring is provided for regulating sliding movement of the regulating sleeve.

When the bit is inserted from the tip of the tool holder into the bit-insertion hole of the tool-holding tube, the bit abuts against and pivots the stopper spring. The pivoting movement of the stopper spring presses the regulating sleeve in the opposite direction of movement of the bit, that is, toward the tip of the tool holder. This movement of the regulating sleeve moves the key inward in the radial direction of the tool-holding tube into engagement with the groove of the bit. In this way, the stopper spring allows the regulating sleeve to move forward when the bit is inserted into the tool holder, but prevents the regulating sleeve from moving backward when the bit is pulled outward from the central hole of the tool-holding tube. As a result, the bit can be mounted in the tool holder without manipulating the tool sleeve.

SUMMARY OF THE INVENTION

However, the tool holder described in Japanese Patent-Application Publication No. HEI-3-43003 can be troublesome to assemble and disassemble. For example, when the tool holder is being assembled, the ball can accidentally fall out from the elongated hole. Also, when the tool holder is being disassembled, the spring can flip the ball out.

The tool holder described in Japanese Patent-Application Publication No. HEI-9-70772 is also troublesome to assemble and disassemble in the same manner as described in Japanese Patent-Application Publication No. HEI-3-43003. That is, when the tool holder is being assembled, the key can accidentally fall out from the elongated hole. Also, when the tool holder is being disassembled, the spring can flip the key out. The tool holder described in Japanese Patent-Application Publication No. HEI-9-70772 additionally has a complicated overall configuration because of the stopper spring and other required components. Furthermore, the tool holder is likely to be assembled incorrectly.

It is an objective of the present invention to provide a tool holder with a simple configuration that is easy to assemble and disassemble, that prevents the engagement member from falling out during assembly, and that prevents the engagement member from being flipped out during disassembly.

According to the present invention, a tool holder, for mounting a bit formed with a groove onto a power tool, includes a tool-holding tube, an engagement member, and a resilient member. The tool-holding tube defines a bit insertion hole that extends in an axial direction. The tool-holding tube is formed with an elongated hole that is in connection with the bit insertion hole and that extends in the axial direction. The engagement member is disposed in the elongated hole and partially protrudes into the bit insertion hole. The engagement member is movable, by abutment with and pressing force from the bit being inserted into the bit insertion hole, in the axial direction and, when located at a retraction position in the axial direction, also outward in a radial direction of the tool-holding tube. The resilient member is disposed to an outer periphery of the tool-holding tube at the retraction position. The resilient member increases in radial dimension from an initial state by pressure from the engagement member moving outward by pressing force from the bit. The resilient member resiliently returns to the initial state when pressure from the engagement member stops because the groove of the bit is located at the retraction position. As a result, the resilient member presses the engagement member inward in the radial direction into engagement with the groove of the bit.

With this configuration, the resilient member prevents the engagement member from falling our during assembly and from being flipped out during disassembly of the tool holder. As a result, assembly and disassembly can be easily performed with a simple configuration.

According to another aspect of the present invention, the resilient member is a thin-plate spring. With this configuration, only a small space is required for providing the resilient member to the outer periphery of the tool holder.

According to another aspect of the present invention, the thin-plate spring has an opening portion. Also, the tool-holding tube is provided with a stopper that protrudes into the opening portion of the thin-plate spring. The stopper prevents rotational movement of the thin-plate spring in a circumference direction of the tool-holding tube.

With this configuration, rotation of the thin-plate spring in the circumference direction of the tool holder can be prevented so that the bit can be reliably mounted and removed using the engagement member.

BRIEF DESCRIPTION OF THE DRAWINGS

The above and other objects, features and advantages of the invention will become more apparent from reading the following description of the embodiment taken in connection with the accompanying drawings in which:

FIG. 10(*b*) is a cross-sectional view taken along line b—b of FIG. 10(*a*);

FIG. 10(*c*) is a view showing a coil spring of the tool holder of FIG. 10(*a*);

DETAILED DESCRIPTION OF THE EMBODIMENTS

Figure 1:
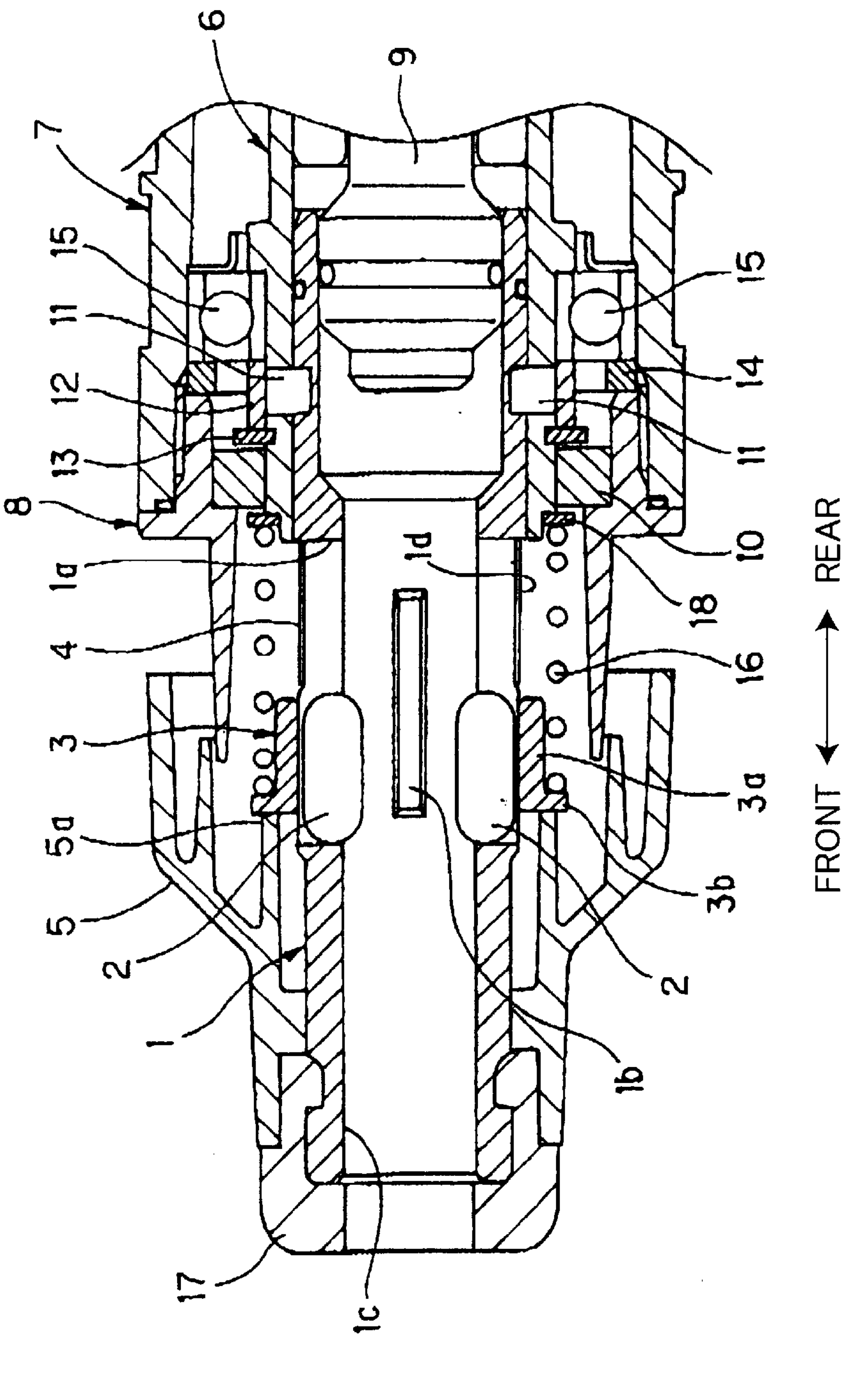
FIG. 1 is a lengthwise cross-sectional view showing a tool holder according to a first embodiment of the present invention before a bit is inserted therein.

Tool holders according to embodiments of the present invention will be described while referring to the accompanying drawings. During the following explanation, front and rear directions are as indicated in the drawings and are referred collectively as the axial direction.

First, a tool holder A according to a first embodiment of the present invention will be described while referring to FIGS. 1 to 7. The tool holder A of the embodiment is adapted for mounting a bit 20 onto a hammer drill. As shown in FIG. 2, the bit 20 is formed with grooves 20*b*, 20*b*, 20*b* at its outer periphery. The grooves 20*b*, 20*b*, 20*b* are elongated following the axial direction of the bit 20.

Figure 2:
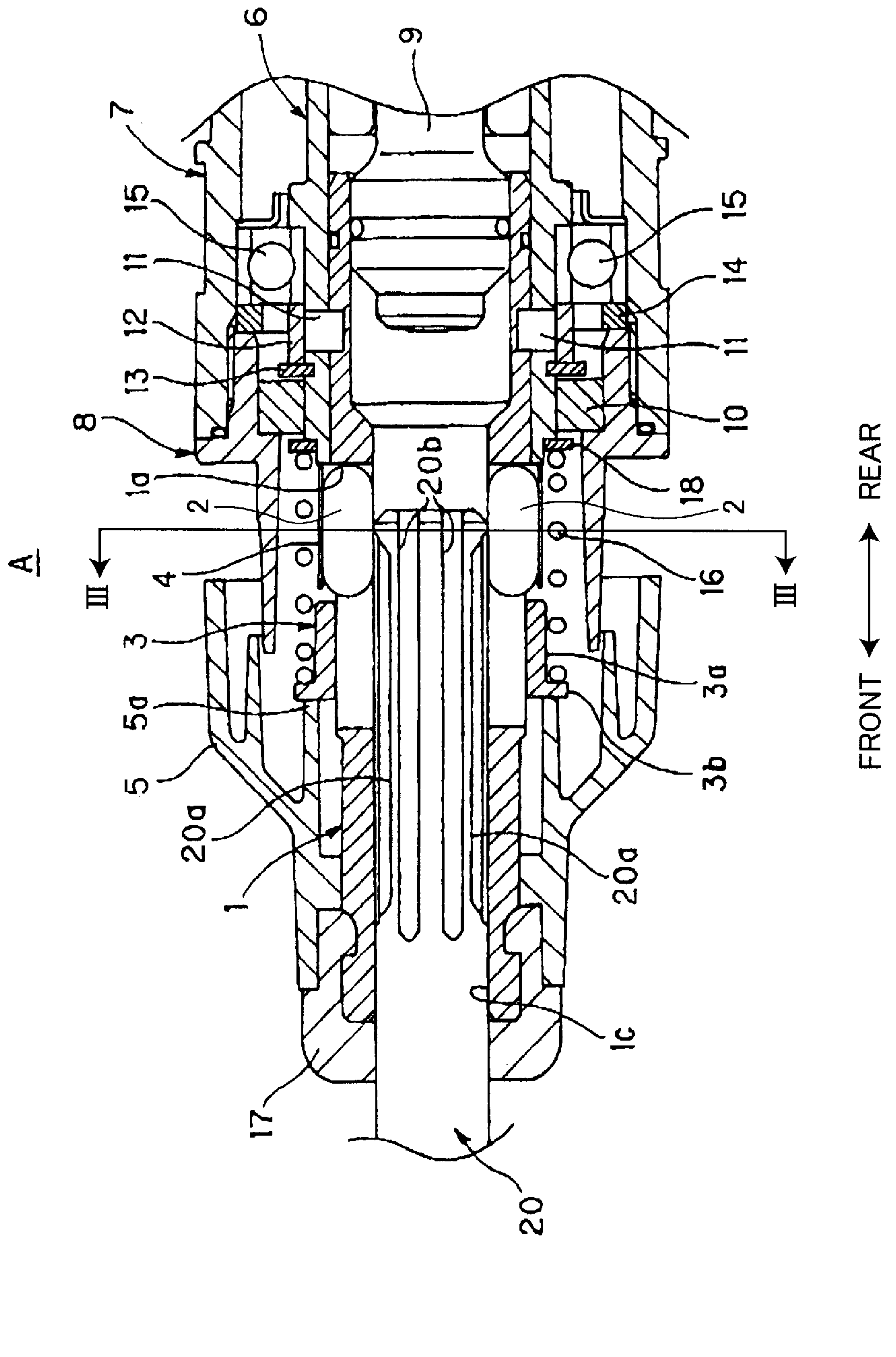
FIG. 2 is a lengthwise cross-sectional view showing the tool holder of FIG. 1 wherein engagement members are displaced by partial insertion of a bit.

As shown in FIG. 1, the hammer drill includes a cylinder 6, a barrel 7, a striking element 9, and a bearing 15. The bearing 15 is provided for enabling rotation of the cylinder 6 within the barrel 7 in the circumference direction of the barrel 7. The striking element 9 and a piston (not shown) are reciprocally slidably disposed to the interior of the rear end of the cylinder 6 and define an air chamber therebetween.

Although not shown in the drawings, a power motor is provided in a motor case and a power transmission mechanism is provided for transmitting power from the power motor to the cylinder 6 to rotate the cylinder 6 in its circumference direction.

As shown in FIG. 1, the tool holder A includes a tool-holding tube 1, rollers 2, 2, a sleeve collar 3, a thin-plate spring 4, and a tool sleeve 5. The tool-holding tube 1 is formed in a tubular shape defining a bit insertion hole 1*c* by its inner wall. A pair of opposing elongated holes 1*a*, 1*a* are formed at the substantial center of the tool-holding tube 1 with respect to the axial direction. The elongated holes 1*a*, 1*a* extend in the axial direction of the tool-holding tube 1 and are in connection with the bit insertion hole 1*c*.

Figure 3:
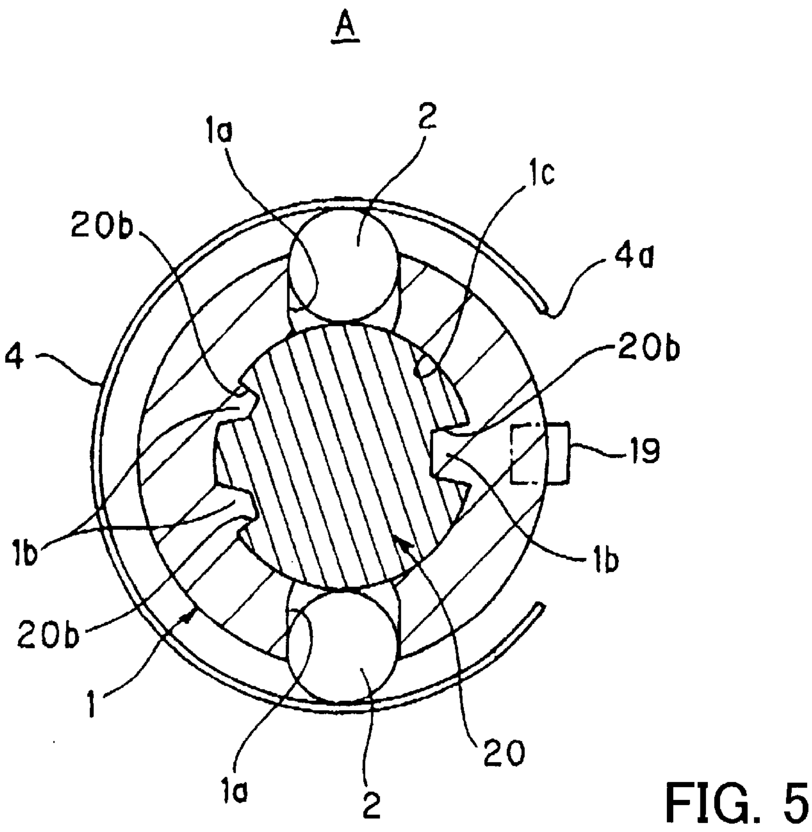
FIG. 3 is a cross-sectional view taken along line III—III of FIG. 2.

As shown in FIG. 3, the elongated holes la are formed with an outer-peripheral width that is slightly larger than the radius of the rollers 2, 2 and with an inner-peripheral width that is smaller than the radius of the rollers 2, 2. Accordingly, the rollers 2, 2 can be inserted into the elongated holes 1*a* from the outer peripheral side of the tool-holding tube 1 without the danger of falling into the bit insertion hole 1*c*. Once the rollers 2, 2 are inserted into the elongated holes 1*a*, the rollers 2, 2 will protrude slightly into the bit insertion hole 2*c* because of the rounded shape of the rollers 2, 2. Also, each elongated hole 1*a* is longer than the rollers 2, 2. In the embodiment of FIG. 1, the elongated holes 1*a* are about twice as long as the rollers 2, 2.

The tool-holding tube 1 is formed with ribs 1*b*, 1*b*, 1*b* on its inner peripheral surface at its substantial center. The ribs 1*b*, 1*b*, 1*b* are elongated following the axial direction. The ribs 1*b*, 1*b*, 1*b* are engagable with the grooves 20*b*, 20*b*, 20*b* of the bit 20.

The tool-holding tube 1 is formed with a ring-shaped step portion 1*d* around its outer peripheral surface. The step portion 1*d* extends from the substantial center of the elongated holes 1*a*, 1*a* to the rear tip of the tool-holding tube 1. The step portion 1*d* serves to maintain the spring 4 in a fixed position on the tool-holding tube 1.

The rear end of the tool-holding tube 1 is fitted in the front end of the cylinder 6 and connected to the cylinder 6 by connection pins 11, 11. A ring-shaped connection pin presser 12 is attached at the outer peripheral surface of the cylinder 6 where the tool-holding tube 1 and the cylinder 6 are connected together. The connection pin presser 12 abuts the upper tip of the connection pins 11, 11 and prevents the connection pins 11, 11 from pulling out. A C-shaped ring 13 is provided for regulating movement of the connection pin presser 12 in the axial direction of the cylinder 6.

The tool-holding tube 1 rotates in association with the cylinder 6. Simultaneously with this, the power from the power motor (not shown) is transmitted to the piston, and drives the piston to move reciprocally in the axial direction of the piston. The air chamber between the piston and the striking element 9 function as an air spring that resiliently and intermittently moves the striking element 9. As a result, the tool-holding tube 1 rotates while resiliently and intermittently moving in the axial direction in association with movement of the striking element 9.

As shown in FIG. 1, the rollers 2, 2 are each disposed in one of the elongated holes 1*a*, 1*a* of the tool-holding tube 1. Each roller 2 is movable in the axial direction within the corresponding elongated hole 1*a* and also in the radial direction of the tool-holding tube 1 when located at their retraction position.

The sleeve collar 3 includes a collar body 3*a* and a flange 3*b*. The collar body 3*a* is formed with an inner diameter slightly larger than the outer diameter of the tool-holding tube 1 and with a length slightly shorter than the length of the rollers 2, 2. The flange 3*b* is formed integrally to one end of the collar body 3*a* and extends radially outward. As shown in FIG. 1, the sleeve collar 3 is fitted on the outer surface of the tool-holding tube 1 at the substantial center of the tool-holding tube 1 with respect to the axial direction.

Figure 5:
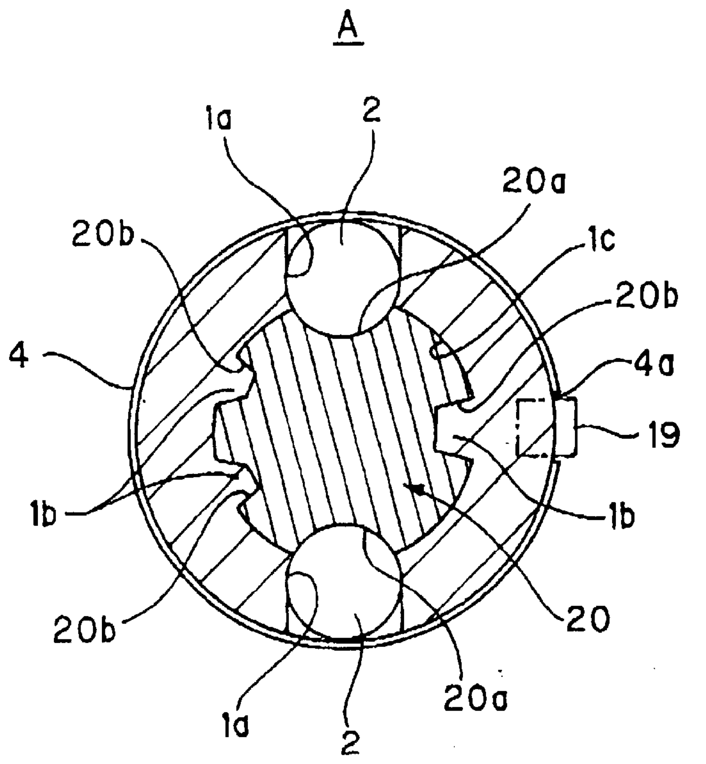
FIG. 5 is a cross-sectional view taken along line V—V of FIG. 4.

The thin-plate spring 4 is located at the retraction position of the rollers 2, 2 and has a C-shape as viewed in cross-section as in FIGS. 3 and 5. That is, a portion of the thin-plate spring 4 is cut out from it circumference to form an opening portion 4*a*. As shown in FIG. 1, the thin-plate spring 4 is formed to have a width in the axial direction that is slightly shorter than the width of the step portion 1*d*. Also, the thin-plate spring 4 is formed to have a circumference that is slightly shorter than the outer-peripheral circumference of the step portion 1*d*.

With this configuration, when the rear end of the bit 20 is located at the retraction position, that is, at the thin-plate spring 4 as shown in FIG. 2, the rear end of the bit 20 presses the rollers 2, 2 to protrude outward through the elongated holes 1*a*, 1*a* away from the outer peripheral surface of the tool-holding tube 1 as shown in FIG. 3. The rollers 2, 2 press the thin-plate spring 4 outward, so that the thin-plate spring 4 resiliently deforms outward, which increases the diameter of the thin-plate spring 4 from its initial state.

Figure 4:
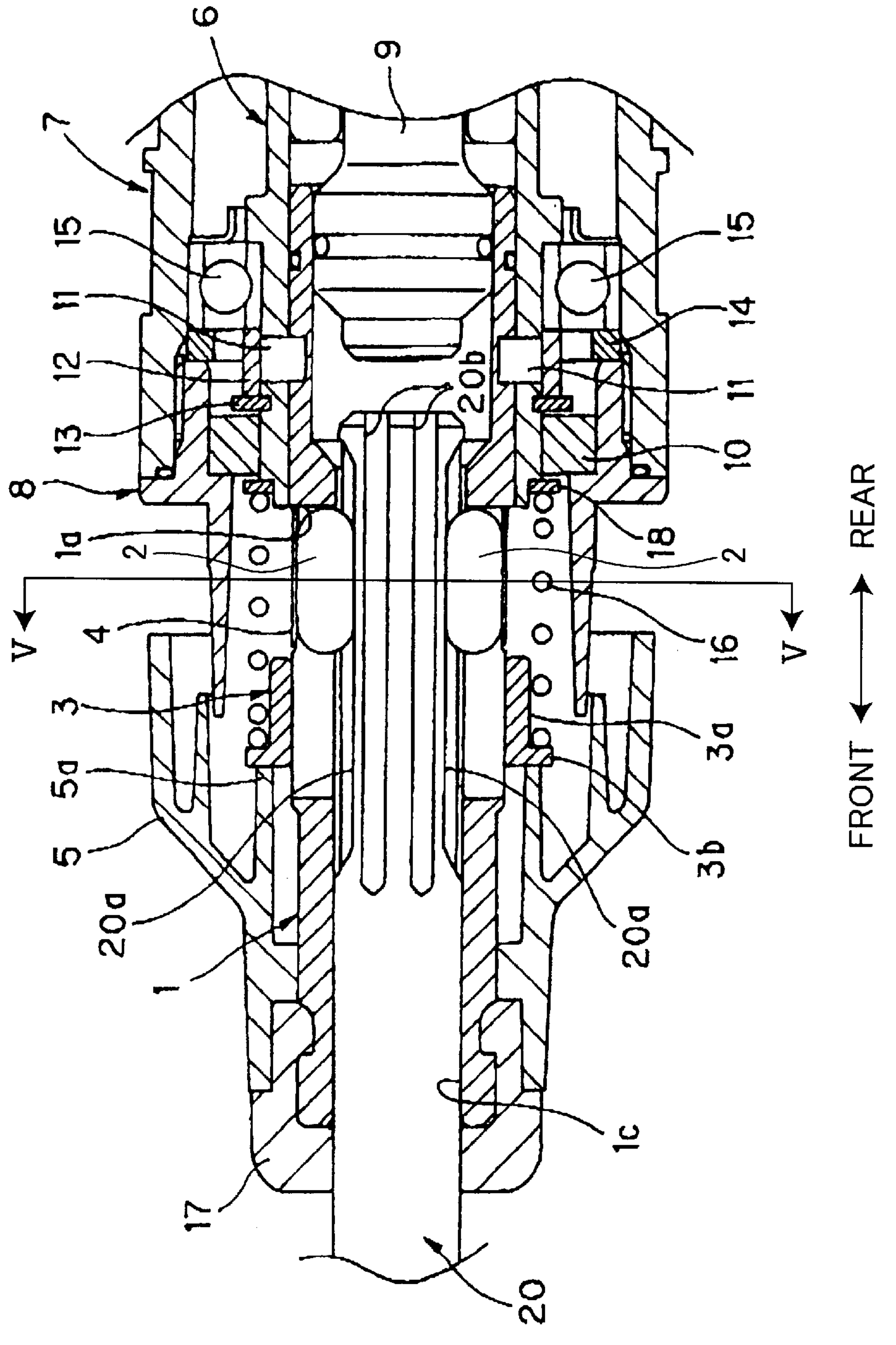
FIG. 4 is a lengthwise cross-sectional view showing the tool holder of FIG. 1 wherein the bit is fully inserted and engagement members are engaged in grooves of the bit.

After the rear end of the bit 20 passes beyond the step portion 1*d* as shown in FIG. 4, then the rollers 2, 2 retract into the elongated holes 1*a*, 1*a* under the urging force of the thin-plate spring 4. The thin-plate spring 4 resiliently deforms inward under its recovery force and contracts in its diameter back to its initial state into intimate contact with the step portion 1*d*. While the thin-plate spring 4 is contracted in its diameter, movement of the thin-plate spring 4 in its axial direction is restricted by the step portion 1*d*. It should be noted that when the thin-plate spring 4 is in its initial state, the outer diameter of the thin-plate spring 4 is smaller than the inner diameter of the sleeve collar 3.

As shown in FIG. 3, a rotation-prevention key 19 is provided in the step portion id of the tool-holding tube 1. The rotation-prevention key 19 engages with the opening portion 4*a* of the thin-plate spring 4 to restrict rotation of the thin-plate spring 4 around the tool-holding tube 1 in the circumferential direction of the tool-holding tube 1.

A spring seat 18 is provided at the tip of the cylinder 6. A compression coil spring 16 is disposed between the spring seat 18 and the flange 3*b* of the sleeve flange 3. The compression spring 16 applies an urging force to the sleeve flange 3 that urges the tool-holding tube 1 to move forward.

The tool sleeve 5 is mounted around the outer periphery of the front tip of the tool-holding tube 1 so as to slidable in the axial direction of the tool-holding tube 1. The tool sleeve 5 has abutment portions 5*a* disposed at its inner side. The abutment portions 5*a* are maintained in abutment with the flange 3*b* of the sleeve collar 3 under the urging force of the compression coil spring 16 against the flange 3*b*. The abutment portions 5*a* are separated from the outer peripheral surface of the tool-holding tube 1 by a distance that allows the rollers 2, 2 to move outward in the radial direction of the tool-holding tube 1 when the tool sleeve 5 moves rearward in association with the sleeve collar 3 against the urging force of the compression coil spring 16.

A dust cap 17 is attached at the tip of the tool-holding tube 1 and determines the forward-most position that the tool sleeve 5 can slide in the forward direction.

Further, a front cap 8 is screwed into the inside of the front tip of the barrel 7. The front cap 8 is for covering over the space between the tool sleeve 5 and the front tip of the barrel 7 when the tool sleeve 5 is at its frontward-most position in the axial direction as shown in FIG. 1. An oil seal 10 is provided between the front cap 8 and the cylinder 6. Also, shock absorbing rubber 14 is disposed between the rear end of the front cap 8 and the bearing 15.

Next, an explanation will be provided for operation of the tool holder A. Before the bit 20 is mounted in the tool holder A, the sleeve collar 3 is in the condition shown in FIG. 1, wherein urging force of the compression coil spring 16 has moved the sleeve collar 3 into the frontward-most position. At this time, the rollers 2, 2 are positioned to the interior of the sleeve collar 3, with a portion of each roller 2, 2 protruding into the bit insertion hole 1*c* of the tool-holding tube 1.

When the rear end of the bit 20 is inserted into the bit insertion hole 1*c*, the rear end of the bit 20 abuts against the rollers 2, 2. Because the rollers 2, 2 are disposed to the interior of the sleeve collar 3, they can not be moved outwardly in the radial direction of the tool-holding tube 1. Therefore, when the bit 20 is inserted further into the bit insertion hole 1*c*, the rollers 2, 2 move only rearward with the bit 20. However, once the rollers 2, 2 move rearward beyond the sleeve collar 3 as shown in FIGS. 2 and 3, the rollers 2, 2 move outward in the radial direction of the tool-holding tube 1 against the urging force of the thin-plate spring 4.

When the bit 20 is inserted further into the bit insertion hole 1*c* so that the rear end of the bit 20 passes beyond the rollers 2, 2 as shown in FIGS. 4 and 5, then the urging force of the thin-plate spring 4 returning to its initial state moves the rollers 2, 2 inward in the radial direction of the tool-holding tube 1 into engagement in the grooves 20*a*, 20*a* of the bit 20. Also during the insertion process, the ribs 1*b*, 1*b*, 1*b* of the tool-holding tube 1 engage in the reception grooves 20*b*, 20*b*, 20*b* of the bit 20. Accordingly, the rotational force of the tool-holding tube 1 is transmitted to the bit 20. In this way, the bit 20 can be reliably mounted in the tool-holding tube 1 without manipulating the tool sleeve 5.

When in this mounted condition, the bit 20 can move in the axial direction within the limits allowed by the grooves 20*a*, 20*a*. Accordingly, the bit 20 moves resiliently and intermittently in linking association with the striking element 9 while rotating with the tool-holding tube 1, so that the user can perform chiseling operations on a work piece using the bit 20.

Figure 6:
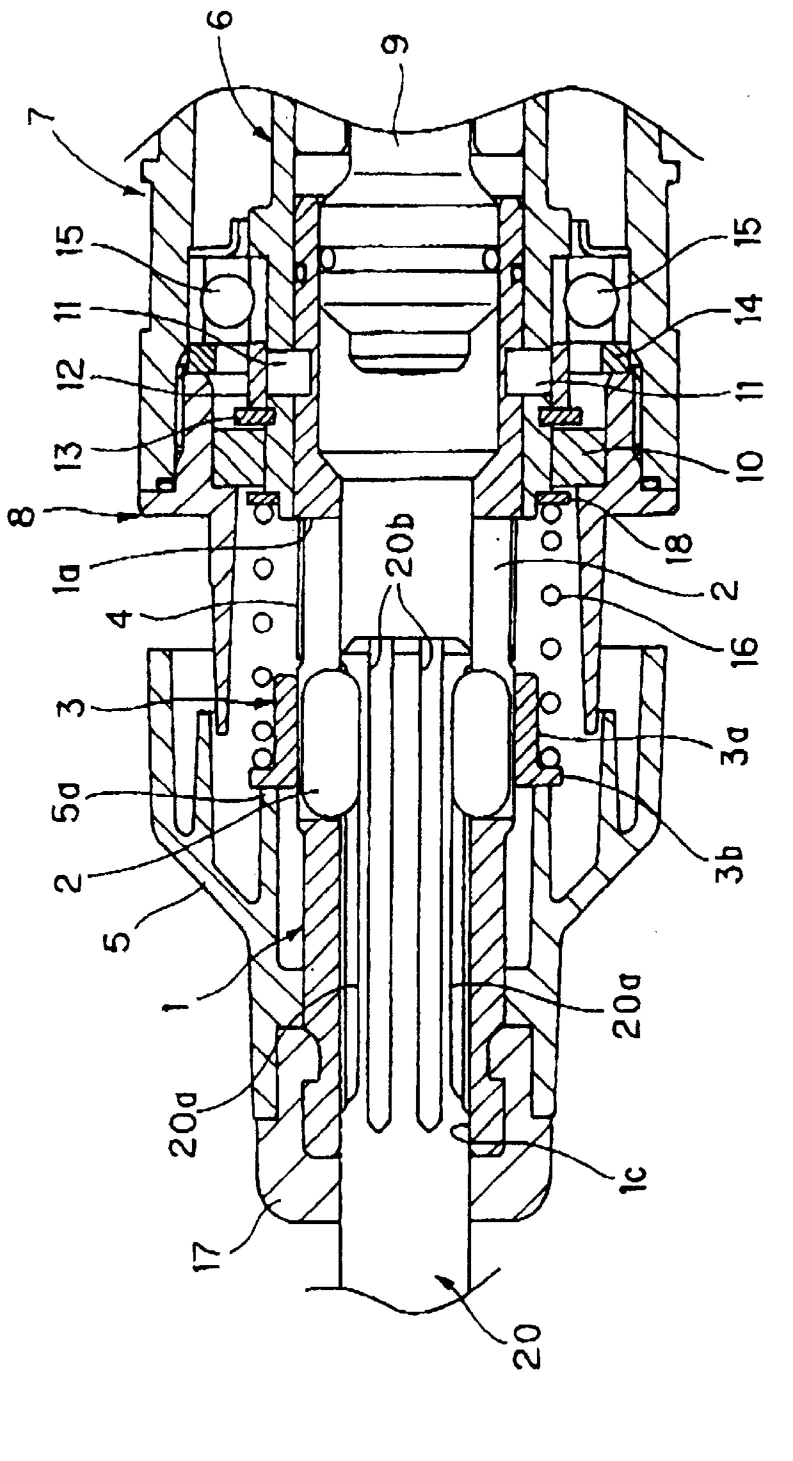
FIG. 6 is a lengthwise cross-sectional view showing the tool holder of FIG. 4 when the inserted bit is separated from a work piece.

When the bit 20 is separated from the work piece, then the rear portion of the grooves 20*a*, 20*a* in the bit 20 press the rollers 2, 2 forward from wherever the rollers 2, 2 are in the elongated holes 1*a*, 1*a* with respect to the axial direction of the tool-holding tube 1 to the position shown in FIG. 6 to the interior of the sleeve collar 3. Because the rollers 2, 2 are to the interior of the sleeve collar 4, the rollers 2, 2 cannot move outward in the radial direction of the tool-holding tube 1. Accordingly, the rollers 2, 2 effectively prevent the bit 20 from pulling out of the tool-holding tube 1.

Figure 7:
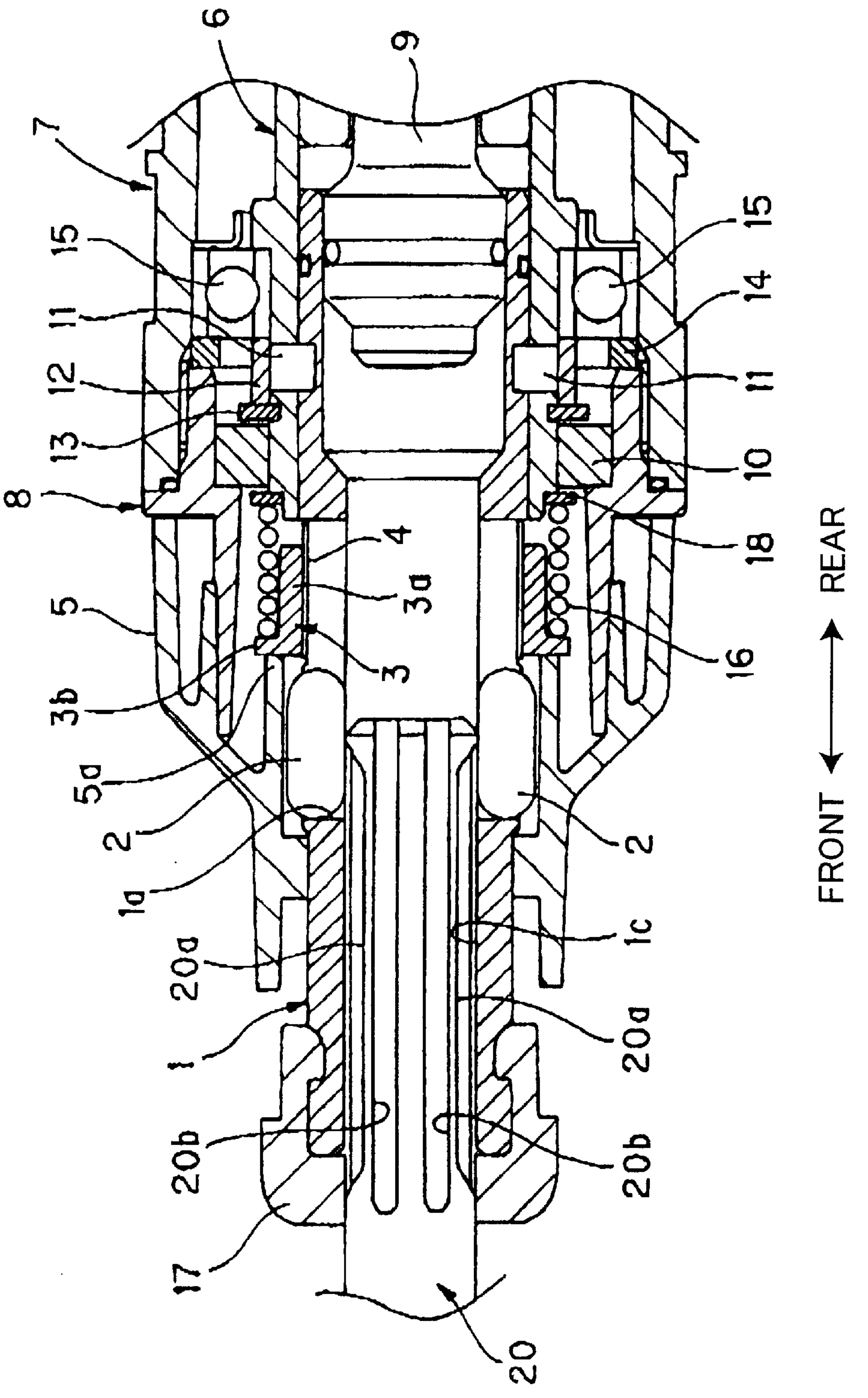
FIG. 7 is a cross-sectional view showing the tool holder of FIG. 1 with a tool sleeve pulled rearward to enable detachment of the bit.

To remove the bit 20 from the tool-holding tube 1, the user slides the tool sleeve 5 rearward against the urging force of the compression coil spring 16 to the condition shown in FIG. 7. In this condition, the bit 20 needs to merely be moved forward and pulled out. That is, when the tool sleeve 5 is moved rearward in this manner, the sleeve collar 3 also moves rearward. Once the sleeve collar 3 is moved beyond the rollers 2, 2, movement of the rollers 2, 2 outward in the radial direction of the tool-holding tube 1 will no longer be restricted. Accordingly, in the condition shown in FIG. 7, if the bit 20 is moved forward, then the rear end of the bit 20 pushes the rollers 2, 2 outward from engagement with the grooves 20*a*, 20*a*, so that the bit 20 can be removed.

Next, a tool holder B according to a second embodiment of the present invention will be described while referring to FIG. 8. The tool holder B is substantially the same as the tool holder A of the first embodiment, except that a sleeve collar 23 is provided in place of the sleeve collar 3. Components of the tool holder B that are the same as in the tool holder A will be referred to using the same numbering as the tool holder A to avoid duplication of description.

Figure 8:
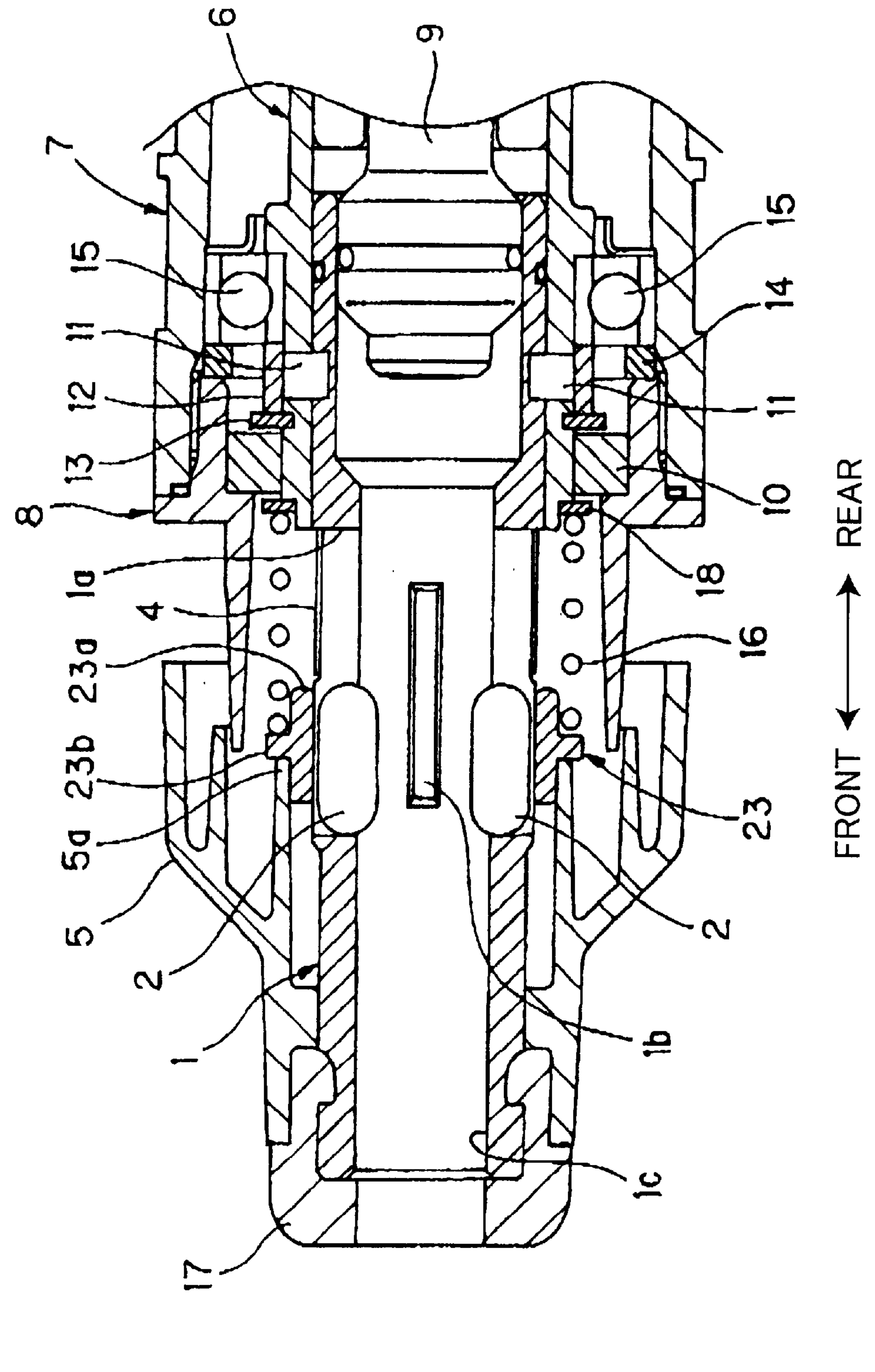
FIG. 8 is a lengthwise cross-sectional view showing a tool holder according to a second embodiment of the present invention before a bit is inserted therein.

As viewed in FIG. 8, the sleeve collar 23 is symmetrical in cross-section in the front and rear sides. The sleeve collar 23 of the tool holder B is configured from a collar body 23*a* and a flange 23*b*. The collar body 23*a* is formed with an inner diameter slightly larger than the outer diameter of the tool-holding tube 1 and with a length slightly shorter than the length of the rollers 2, 2. The flange 3*b* is formed integrally to the central portion of the collar body 3*a*, that is, with respect to the axial direction, and extends radially outward.

The operation of the tool holder B is the same as described above for the tool holder A so its explanation will be omitted. The tool holder B achieves the same effects as the tool holder A and is in addition easier to assemble because the sleeve collar 23 is symmetric frontward and rearward in cross section and so can be mounted onto the tool-holding tube 1 from either side first.

Figure 9:
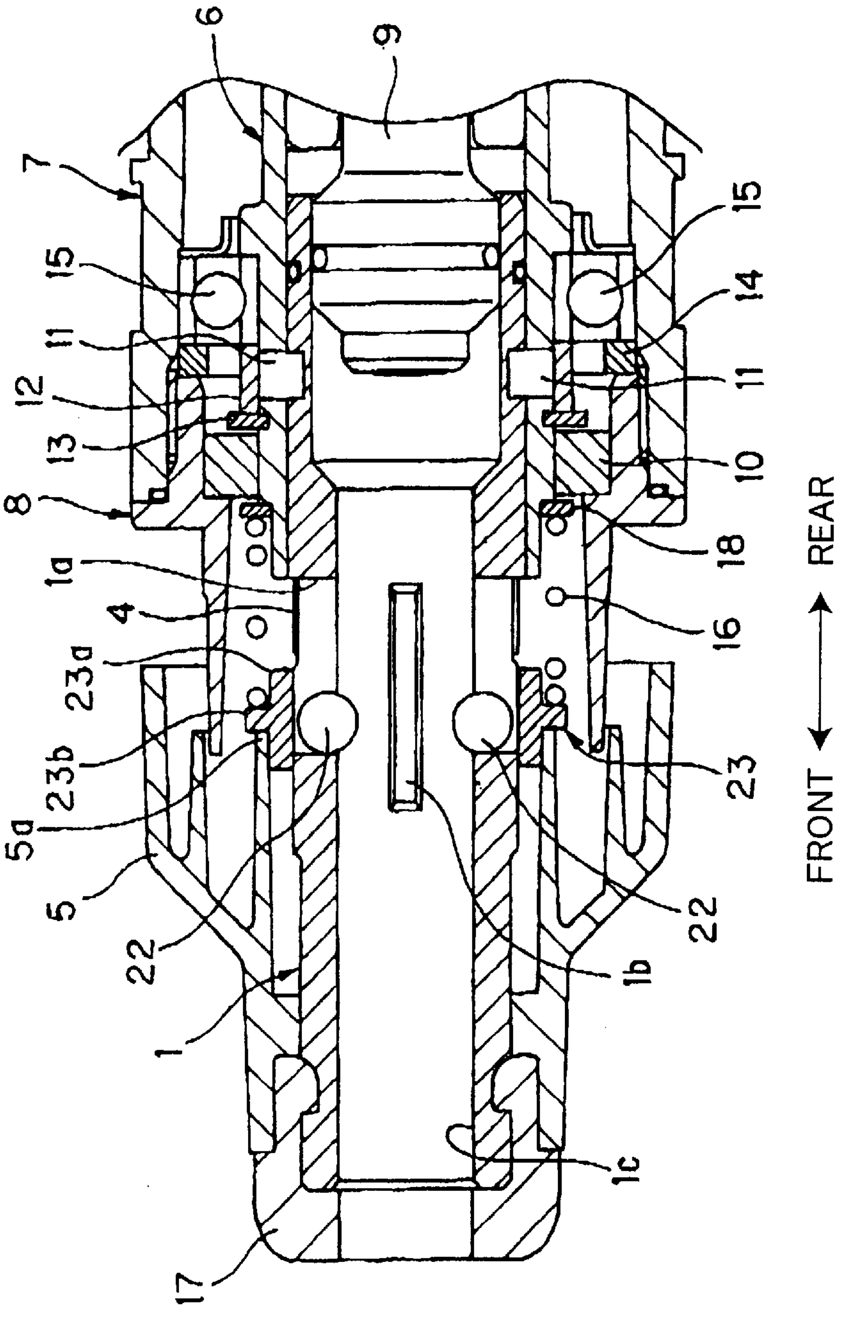
FIG. 9 is a lengthwise cross-sectional view showing a tool holder according to a third embodiment of the present invention before a bit is inserted therein.

Next, a tool holder C according to a third embodiment of the present invention will be described while referring to FIG. 9. The tool holder C has substantially the same configuration as the tool holder B of the second embodiment, except that balls 22 are provided as engagement members instead of the rollers 2, 2. Components of the tool holder B that are the same as for the tool holder C are referred to with the same numbering and their explanation omitted to avoid duplication of description.

The tool holder C of the present embodiment operates in the same manner as the tool holder A of the first embodiment. The tool holder C of the present embodiment achieves the same good effects as the tool holder B of the second embodiment. In addition, because the balls 22 are shorter in the axial direction than the rollers 2, 2, the elongated hole 1*a* of the tool-holding tube 1 and the sleeve collar 23 can both be formed shorter, so that the tool holder C is more compact in general.

Figure 10A:
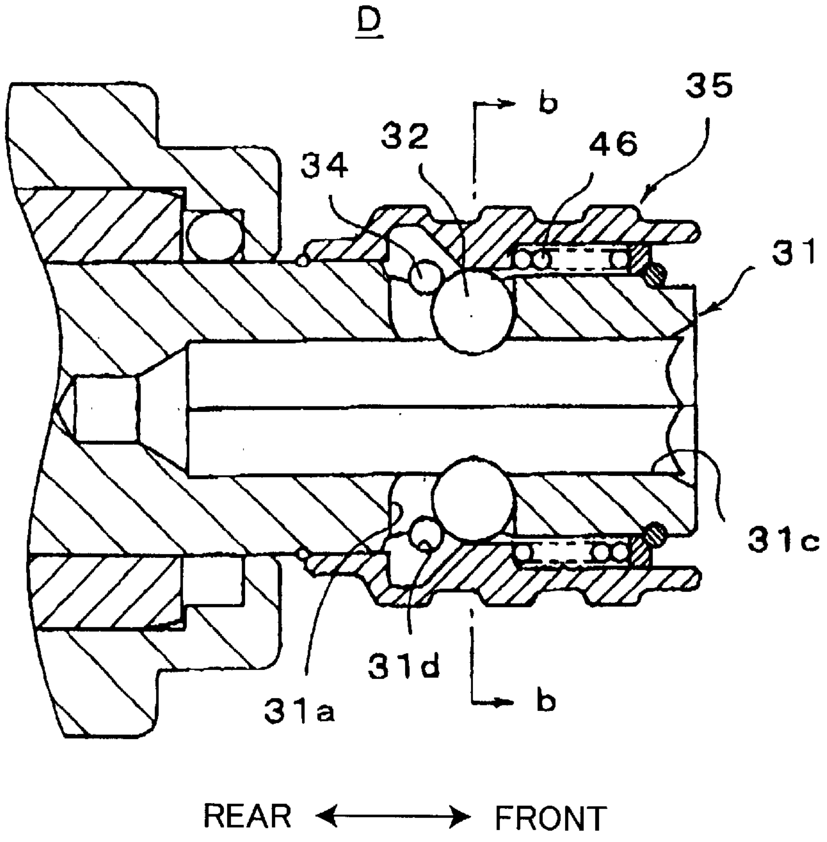
FIG. 10(*a*) is a lengthwise cross-sectional view showing a tool holder according to a fourth embodiment of the present invention before a bit is inserted therein.
Figure 10B:
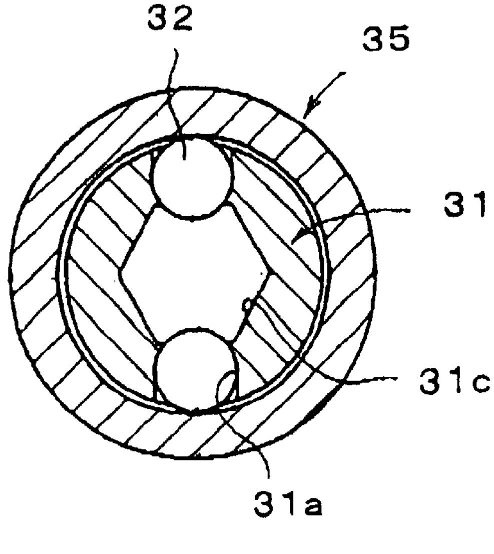
Figure 10C:
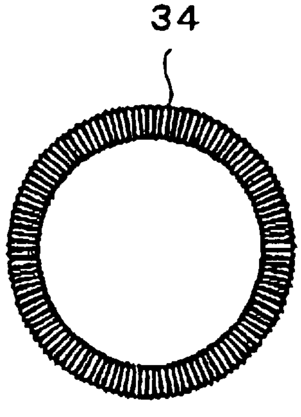

Next, a tool holder D according to a fourth embodiment of the present invention will be described while referring to FIGS. 10(*a*) to 11. The tool holder D is adapted for use with an impact driver. As shown in FIG. 10(*a*), the tool holder D includes a tool-holding tube 31, balls 32, 32, a coil spring 34, and a tool sleeve 35. However, it should be noted that the tool holder D includes no component that corresponds to the sleeve collars 3, 23 of the tool holders A, B, and C.

The tool holder 31 has a bit insertion hole 31*c* with an interior that is hexagonal in shape when viewed in cross section as in FIG. 10(*b*). A pair of mutually-confronting elongated holes 31*a*, 31*a* are formed toward the front end of the tool-holding tube 31 so as to extend in the lengthwise direction of the tool-holding tube 31. The elongated holes 31*a*, 31*a* are connected with the bit insertion hole 31*c*.

As shown in the cross-sectional view of FIG. 10(*b*) the elongated holes 31*a* are formed with an inner width that is shorter than the radius of the balls 32, 32 and with an outer width that is slightly larger than the radius of the balls 32, 32. Accordingly, the balls 32, 32 can be inserted into the elongated holes 31*a* from the outer peripheral side of the tool-holding tube 31. Also, after being inserted, the balls 32 protrude partially into the bit insertion hole 31*c*, but the balls 32 will not drop into the bit insertion hole 31*c*.

Also, the elongated holes 31*a* are formed longer in the axial direction than the diameter of the balls 32. In the example shown in FIG. 10(*a*), the elongated holes 31*a* are formed 1.5 times longer than the diameter of the balls 32.

Figure 11:
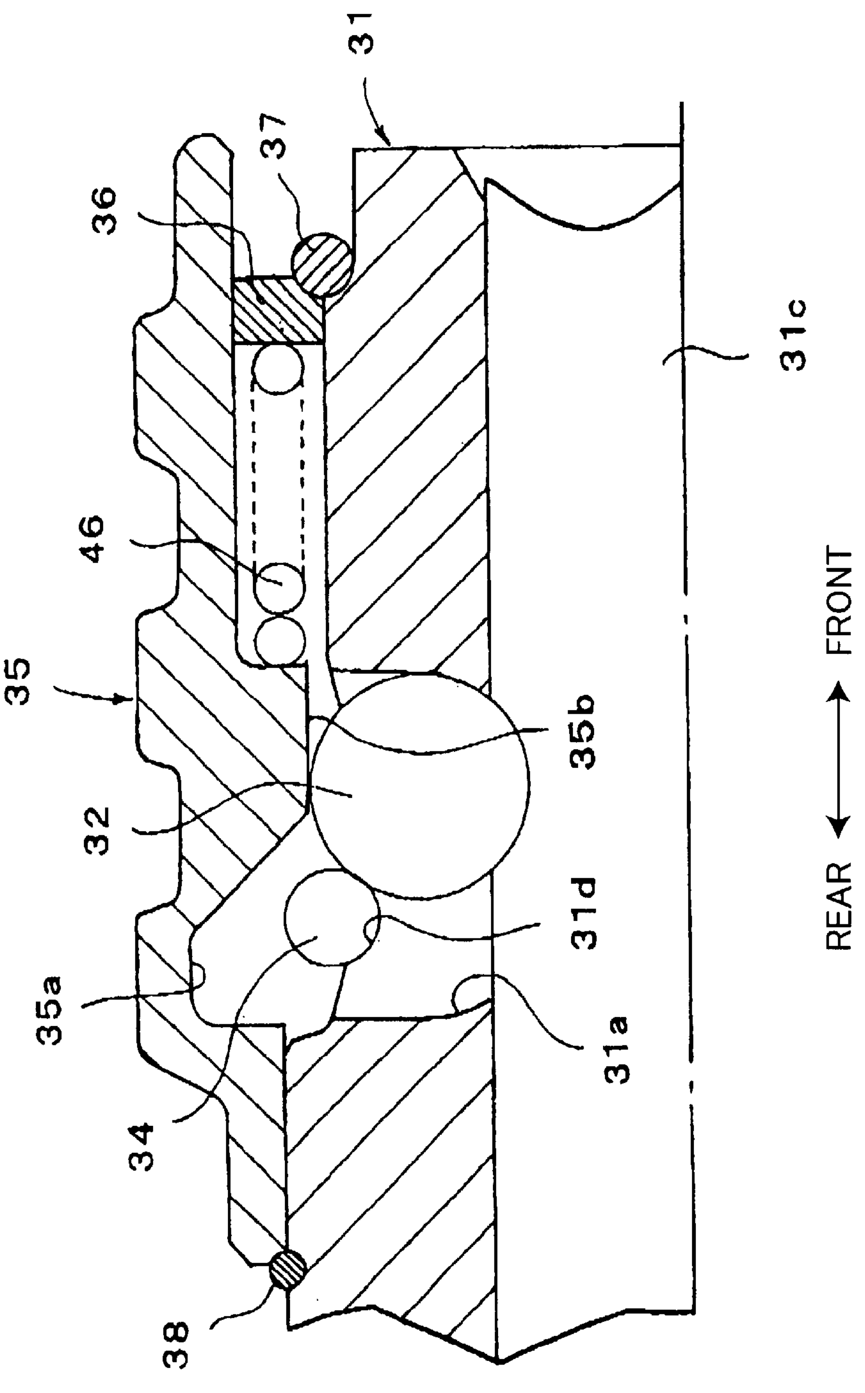
FIG. 11 is a magnified view of FIG. 10(*a*)

As can be best seen in FIG. 11, a groove 31*d* is formed around the periphery of the tool-holding tube 31. The groove 31*d* intersects the elongated holes 31*a*, 31*a* at the retraction position of the bass 22, 22. The groove 31*d* is for holding the coil spring 34.

As shown in FIG. 10(*a*), the balls 32, 32 are disposed in the elongated holes 31*a*, 31*a* of the tool-holding tube 31. The balls 32 are movable in the axial direction of the elongated holes 31*a*, 31*a* and, when located at the retraction position, movable in the radial direction of the tool-holding tube 31.

The coil spring 34 is formed in a ring shape as shown in FIG. 10(*c*) by connecting the free ends of an extension coil spring. The coil spring 34 is mounted in the groove 31*d* of the tool-holding tube 31. While mounted in the groove 31*d*, the coil spring 34 abuts against the balls 32 and resiliently supports them in the forward-most position in the elongated hole 31*a*, that is, separated from the retraction position.

The tool sleeve 35 is attached slidably in the axial direction to the outer periphery the tool-holding tube 31 at the front tip where it covers the elongated holes 31*a*, 31*a* of the tool-holding tube 31. As shown in FIG. 11, the tool sleeve 35 has a space portion 35*a* and a ball pressing portion 35*b*. The space portion 35*a* is located at the retraction position of the balls 32, 32 and forms a ring-shaped space at the inner peripheral surface of the tool sleeve 35. The ring-shaped space houses the coil spring 34 when the tool sleeve 35 is in the condition shown in FIG. 11. The ball pressing portion 35*b* is disposed immediately in front of the space portion 35*a*.

Front and rear stopper rings 37, 38 are fitted around the outer peripheral surface of the tool-holding tube 31. The rear stopper ring 38 sets the limit for how far the tool sleeve 35 can slide rearward. The front stopper ring 37 is engaged with a spring holder 36. The front stopper 37 and the spring holder 36 set the limit for how far the tool sleeve 35 can slide forward. A compression coil spring 46 is interposed between the spring holder 36 and the ball pressing portion 35*b*. The compression coil spring 46 urges the tool sleeve 35 rearward into the position shown in FIG. 11.

When the tool sleeve 35 is in the rearmost sliding position shown in FIG. 11, the balls 32, 32 are resiliently pressed against the front wall of the elongated hole 31*a* by the coil spring 34. Also, in this condition the ball pressing portion

35*b* of the tool sleeve 35 abuts against the balls 32, 32, thereby preventing the balls 32, 32 from moving outward.

It should be noted that configuration of the impact driver other than the tool holder D is the same as a conventional impact driver, so its explanation will be omitted.

Next, operation of the tool holder D when a bit 40 is mounted onto the impact driver will be described while referring to FIGS. 12 to 16. The bit 40 is formed with ring-shaped grooves 40*a*, 40*b* near each end. When the bit 40 is to be attached to the tool holder D, the bit 40 needs merely be inserted into the bit insertion hole 31*c* of the tool-holding tube 31.

Figure 12:
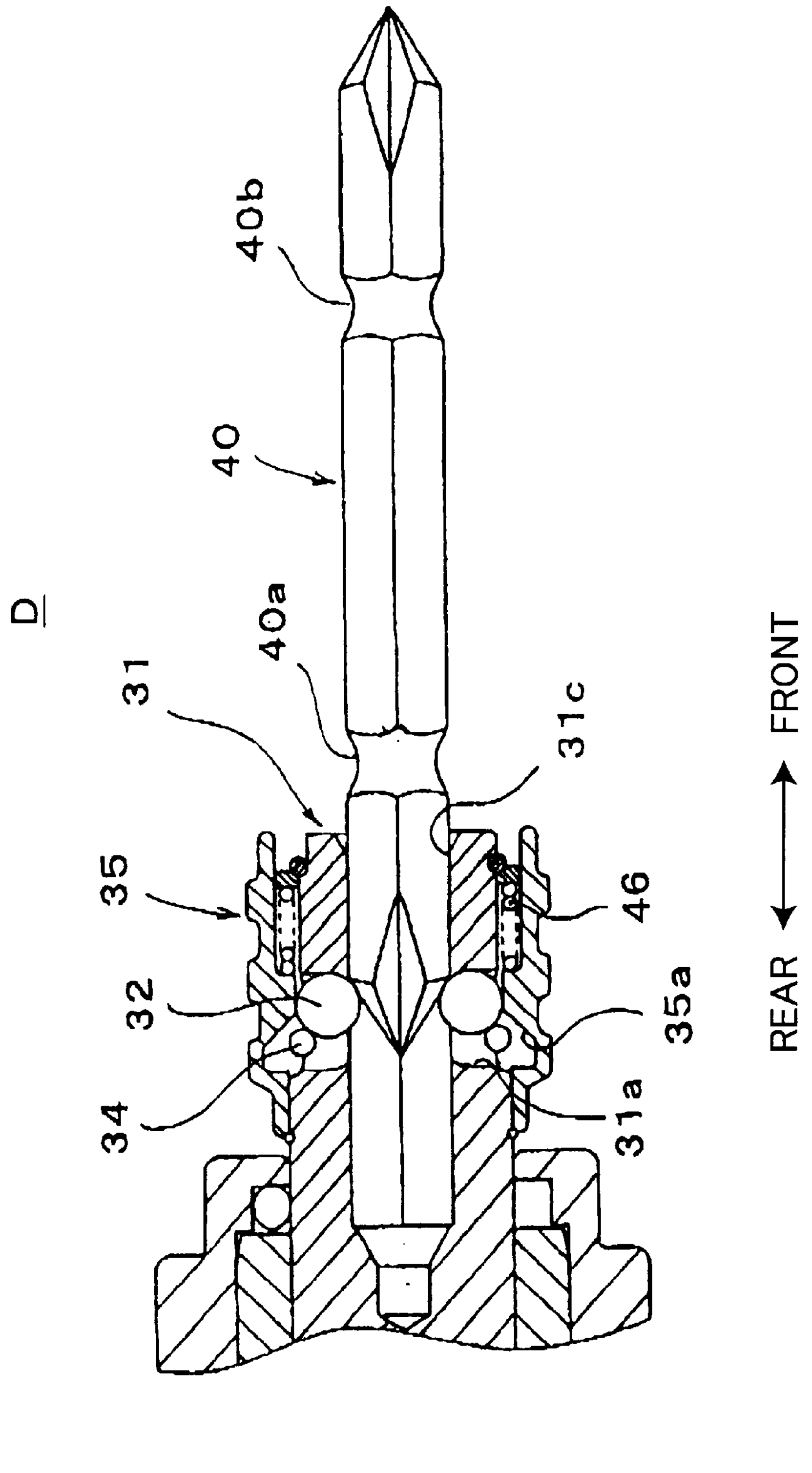
FIG. 12 is a cross-sectional view showing the tool holder of FIG. 10(*a*) when insertion of a bit first starts.
Figure 13:
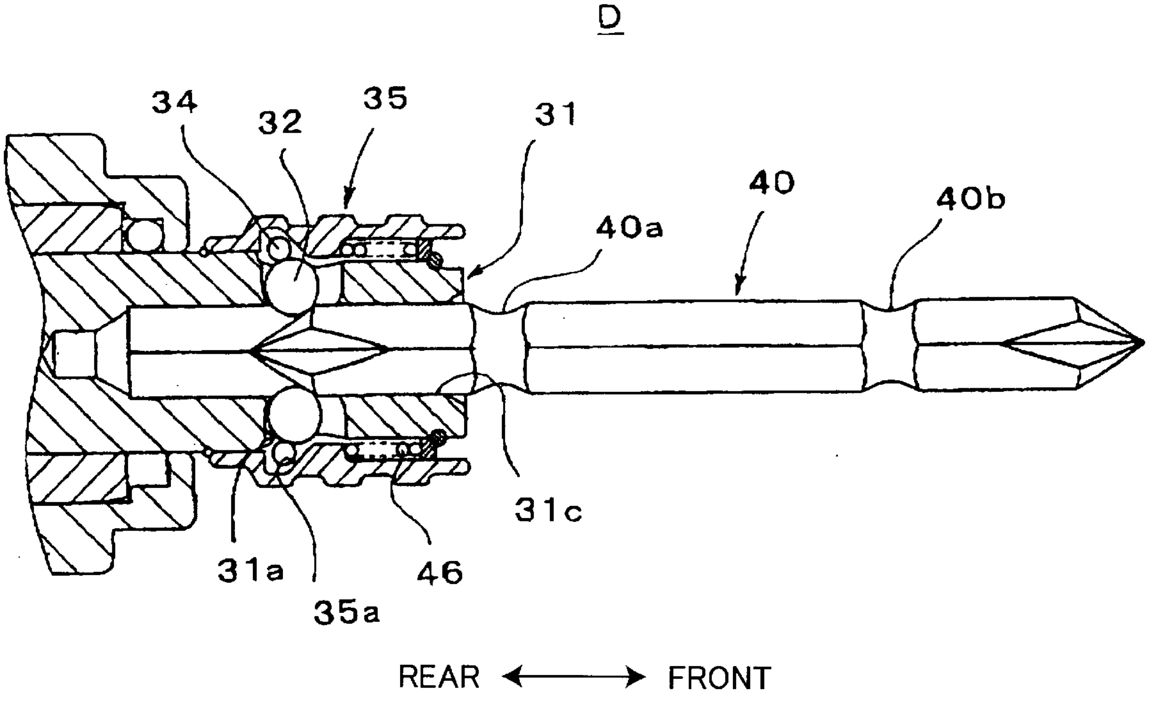
FIG. 13 is a cross-sectional view showing the tool holder of FIG. 10(*a*) with the bit inserted further than in FIG. 12 so that the bit moves groove-engaging balls rearward.

That is, when the bit 40 is inserted into the bit insertion hole 31*c* of the tool-holding tube 31, then as shown in FIG. 12 the rear end of the bit 40 abuts against the balls 32, 32. When the bit 40 is further inserted into the bit insertion hole 31*c*, then as shown in FIG. 13 the bit 40 moves the balls 32, 32 rearward until the balls 32, 32 are located at the retraction position and abut against the rear surface of the elongated holes 31*a*, 31*a*. During this time, the balls 32, 32 press the coil spring outward so that the coil spring 34 expands in diameter as a result.

Figure 14:
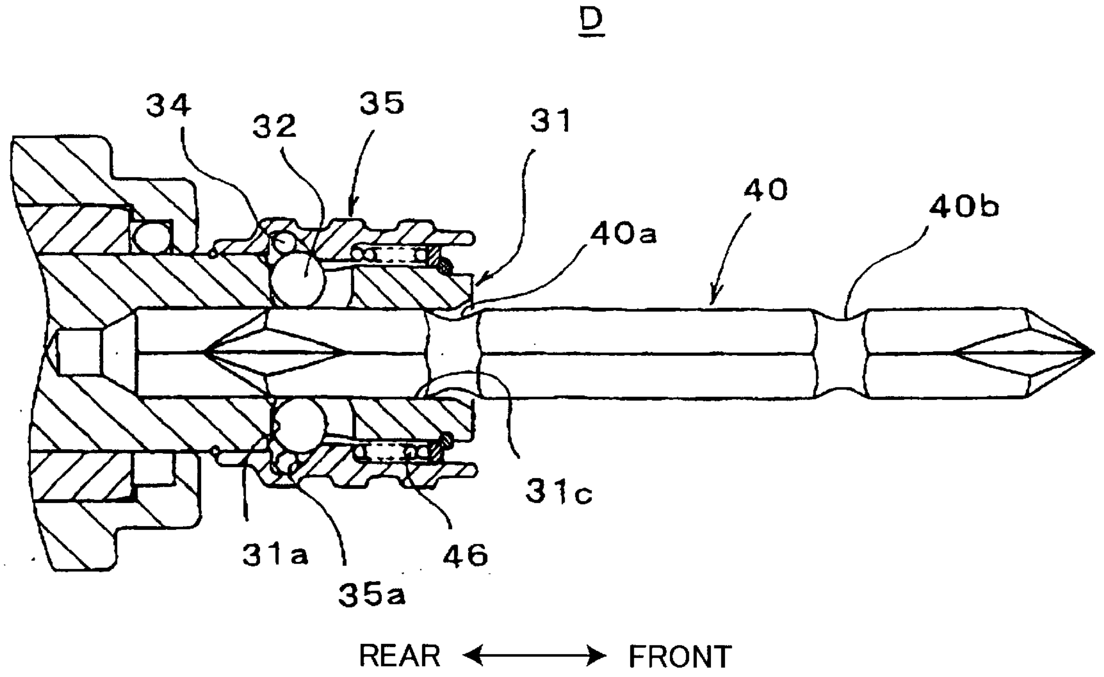
FIG. 14 is a cross-sectional view showing the tool holder of FIG. 10(*a*) with the bit inserted further than in FIG. 13 so that the bit moves the balls outward.

When the bit 40 is further pressed into the bit insertion hole 31*c* as shown in FIG. 14, the coil spring 34 expands in diameter even further and enters into the space portion 35*a* of the tool sleeve 35. In association with this, the balls 32, 32 are moved radially outward from the bit insertion hole 31*c* so that the bit 40 can move further into the bit insertion hole 31*c*.

Figure 15:
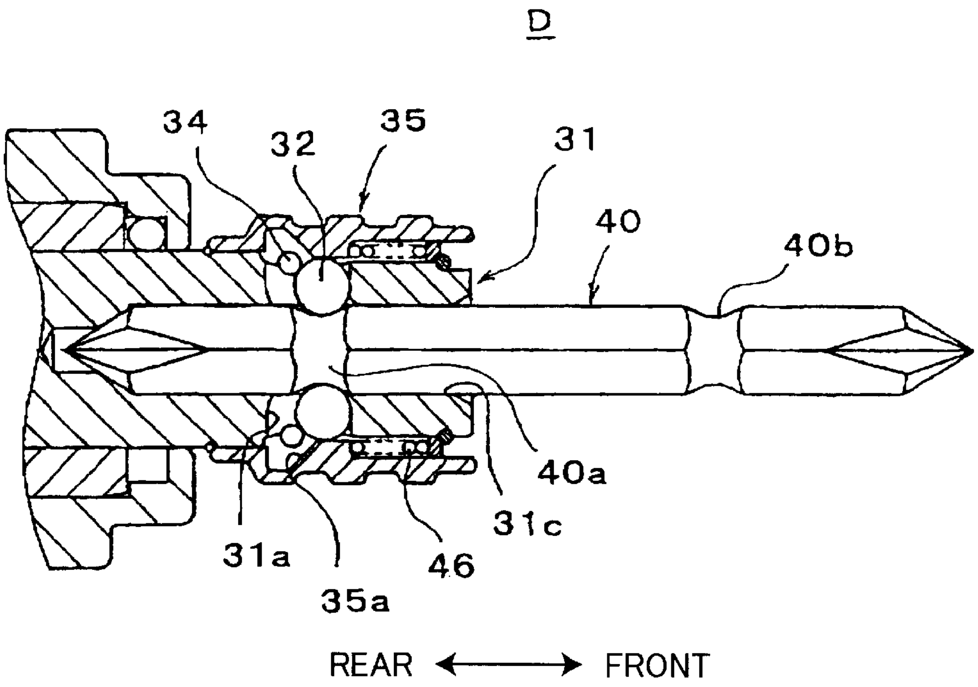
FIG. 15 is a cross-sectional view showing the tool holder of FIG. 10(*a*) with the bit completely inserted.

Once the groove 40*a* of the bit 40 reaches the balls 32, 32, then resilient force of the coil spring 34 moves the balls 32, 32 inward into engagement with the groove 40*a* of the bit 40 as shown in FIG. 15. Once engaged in the groove 40*a*, then the resilient force of the coil spring 34 maintains the balls 32, 32 in abutment with the front most wall of the elongated hole 31*a*. Because the balls 32, 32 abut against the ball pressing portion 35*b* of the tool sleeve 35, the balls 32, 32 cannot move outward unless the tool sleeve 35 is moved.

With the configuration of the tool holder D, the bit 40 can be easily mounted in the tool holder D without a need to manipulate the tool sleeve 35. Furthermore, the bit 40 can be reliably prevented from falling out of the bit insertion hole 31*c*.

Figure 16:
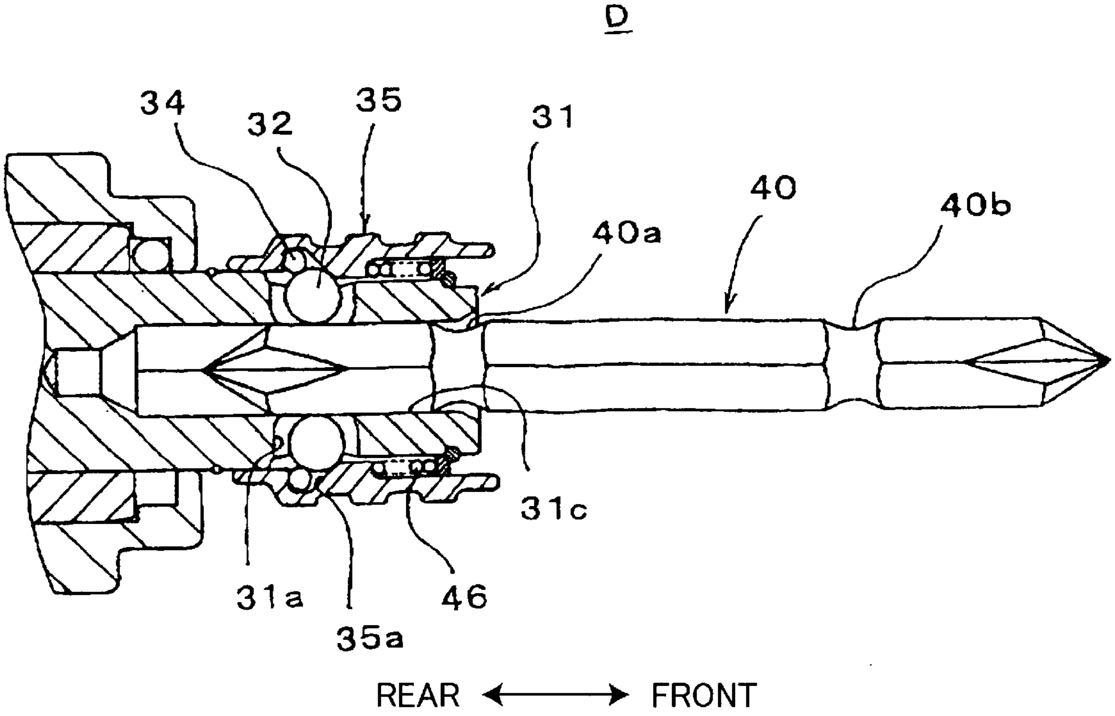
FIG. 16 is a cross-sectional view showing the tool holder of FIG. 10(*a*) with a tool sleeve manipulated to enable removal of the bit.

When the user wants to remove the bit 40 from the tool holder D, then the user moves the tool sleeve 35 forward as shown in FIG. 16 against the urging force of the compression coil spring 46. In this condition, the bit 40 can be easily removed. That is, when the tool sleeve 35 is slid forward, the ball pressing portion 35*b* is moved away from the balls 32, 32. As a result, abutment between the ball pressing portion 35*b* and the balls 32, 32 is released so that the coil spring 34 is free to increase in diameter and the balls 32, 32 can move outward. When the bit 40 is pulled out in this condition, the balls 32, 32 move outward while the coil spring 34 increases in diameter. This releases engagement between the balls 32, 32 and the groove 40*a* of the bit 40 so that the bit 40 can be easily removed from the bit insertion hole 31*c*.

According to the fourth embodiment, the coil spring 34 is described as being formed from a coil spring connected at both ends into a ring shape. However, any member that can resiliently contracts in diameter to place an urging force on the balls 32, 32 can be used instead. For example, a resilient metal wire formed in a C shape or a resilient ring-shaped object molded from a synthetic resin, for example, can be used instead.

What is claimed is:

1. A tool holder for mounting a bit formed with a groove onto a power tool, the tool holder comprising:

a tool-holding tube defining a bit insertion hole that extends in an axial direction, the tool-holding tube being formed with an elongated hole that is in connection with the bit insertion hole and that extends in the axial direction;

an engagement member disposed in the elongated hole and partially protruding into the bit insertion hole, the engagement member movable in the axial direction and, when located at a retraction position in the axial direction, movable outward in a radial direction of the tool-holding tube by abutment with and pressing force from the bit being inserted in an insertion direction into the bit insertion hole;

a radial movement prevention surface provided upstream from the retraction position with respect to the bit insertion direction, the radial movement prevention surface abutting against and preventing the engagement member from moving radially outward under pressing force from the bit so that the engagement member moves axially in the bit insertion direction and not radially while located axially adjacent to the radial movement prevention surface; and a resilient member disposed to an outer periphery of the tool-holding tube at the retraction position downstream from the radial movement prevention surface with respect to the bit insertion direction, the resilient member increasing in radial dimension from an initial state by pressure from the engagement member moving outward by pressing force from the bit, the resilient member resiliently returning to the initial state when pressure from the engagement member stops because the groove of the bit is located at the retraction position, thereby pressing the engagement member inward in the radial direction into engagement with the groove of the bit.

2. A tool holder as claimed in claim 1, wherein the resilient member is a thin-plate spring.

3. A tool holder as claimed in claim 2, wherein the thin-plate spring has an opening portion and the tool-holding tube is provided with a stopper protruding into the opening portion of the thin-plate spring, the stopper preventing rotational movement of the thin-plate spring in a circumference direction of the tool-holding tube.

4. A tool holder as claimed in claim 1, wherein the tool-holding tube is formed with a groove at an outer peripheral surface of the tool-holding tube, the groove intersecting the elongated hole at the retraction position, the resilient member being fitted into the groove.

5. A tool holder as claimed in claim 4, wherein the resilient member is a ring-shaped spring.

6. A tool holder as claimed in claim 1, wherein the radial movement prevention surface is a sleeve collar disposed to the outer periphery of the tool-holding tube at the elongated hole, the sleeve collar being located at a position in front of the retraction position in the axial direction with respect to direction of insertion movement of the bit, the sleeve collar preventing movement of the engagement member outward in the radial direction so that abutment by the bit being inserted pushes the engagement member in the axial direction to the retraction position.

7. A tool holder as claimed in claim 6, wherein the sleeve collar is slidable in the axial direction to the retraction position, an open space that enables the engagement member to move in the radial direction being uncovered at the position in front of the retraction position while the sleeve collar is located at the retraction position, and further comprising an urging means for urging the sleeve collar to the position in front of the retraction position.

8. A tool holder as claimed in claim 7, wherein the engagement member is pressed into the open space by abutment with and pressing force from the bit being drawn out from the insertion hole while the sleeve collar is located at the retraction position, the engagement member being formed with a rounded surface where the bit abuts against the engagement member when pressed into the open space.

9. A tool holder as claimed in claim 7, wherein the sleeve collar is formed with an outwardly extending flange at one end with respect to the axial direction, the urging means abutting against the flange of the sleeve collar to urge the sleeve collar to the position in front of the retraction position.

10. A tool holder as claimed in claim 7, wherein the sleeve collar is formed with an outwardly extending flange at a substantial center of the sleeve collar with respect to the axial direction, the urging means abutting against the flange of the sleeve collar to urge the sleeve collar to the position in front of the retraction position.

11. A tool holder as claimed in claim 1, further comprising a tool sleeve disposed to the outer periphery of the tool-holding tube at the elongated hole, the tool sleeve being formed with a space portion and an engagement member pressing portion, the space portion being located at the retraction position and the engagement member pressing portion being located at a position in front of the retraction position in the axial direction with respect to direction of insertion movement of the bit, the engagement member pressing portion preventing movement of the engagement member outward in the radial direction so that abutment by the bit being inserted pushes the engagement member in the axial direction to the retraction position.

12. A tool holder as claimed in claim 11, wherein the tool sleeve is slidable in the axial direction to move the space portion to the position in front of the retraction position, thereby enabling the engagement member to move in the radial direction when at the position in front of the retraction position, and further comprising an urging means for urging the tool sleeve to the position in front of the retraction position.

13. A tool holder as claimed in claim 12, wherein the engagement member is pressed into the space portion by abutment with and pressing force from the bit being drawn out from the insertion hole while the space portion is located at the position in front of the retraction position, the engagement member being formed with a rounded surface where the bit abuts against the engagement member when pressed into the space portion.

14. A tool holder as claimed in claim 1, wherein the engagement member is formed with a rounded surface where the bit abuts against the engagement member when the bit is inserted into the bit insertion hole.

15. A tool holder as claimed in claim 14, wherein the engagement member has a substantially spherical shape.

16. A tool holder as claimed in claim 14, wherein the engagement member is a roller.

* * * * *